United States Patent [19]

Barcus et al.

[11] 4,166,592

[45] Sep. 4, 1979

[54] SEAT BELT RETRACTOR

[75] Inventors: Edward L. Barcus, Flossmoor, Ill.; Louis J. Romanzi, Milford, Mich.

[73] Assignee: Gateway Industries, Chicago, Ill.

[21] Appl. No.: 619,240

[22] Filed: Oct. 3, 1975

[51] Int. Cl.² .................... A62B 35/02; B65H 75/47
[52] U.S. Cl. ............................................. 242/107.4 A
[58] Field of Search ............... 242/107.4 A; 297/388; 280/744–747

[56] References Cited

U.S. PATENT DOCUMENTS

| | | | |
|---|---|---|---|
| 3,659,800 | 5/1972 | Meyer | 242/107.4 A |
| 3,901,460 | 8/1975 | Dully et al. | 242/107.4 A |
| 3,930,622 | 1/1976 | Tanaka et al. | 242/107.4 A |
| 3,944,162 | 3/1976 | Henderson | 242/107.4 A |

FOREIGN PATENT DOCUMENTS 1430422 11/1968 Fed. Rep. of Germany ... 242/107.4 A

Primary Examiner—Harvey C. Hornsby
Assistant Examiner—John M. Jillions
Attorney, Agent, or Firm—Fitch, Even & Tabin

[57] ABSTRACT

A vehicle sensitive retractor has an inertia weight carried on a spring arm which deflects and allows overtravel of the inertia weight and during this overtravel the weight continues to urge a pawl mechanism into blocking relationship with ratchet wheels on a belt reel. This extra period of time is particularly useful in maintaining actuation of the pawls toward the reel blocking position if the pawls initially abut the other ends of the ratchet teeth without entering between adjacent ratchet teeth. The spring arm may comprise a colied spring section supporting the inertia weight at its lower end or the spring arm may be in the form of a plastic spring.

3 Claims, 7 Drawing Figures

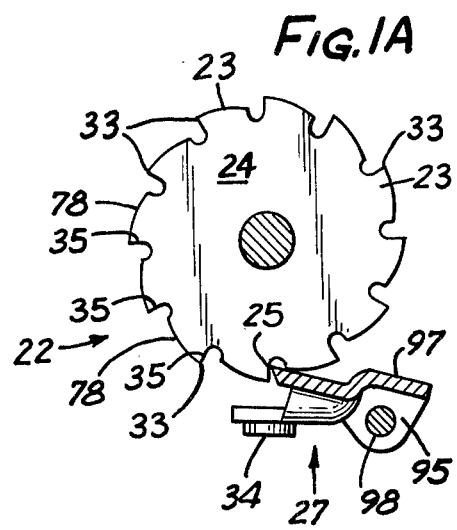
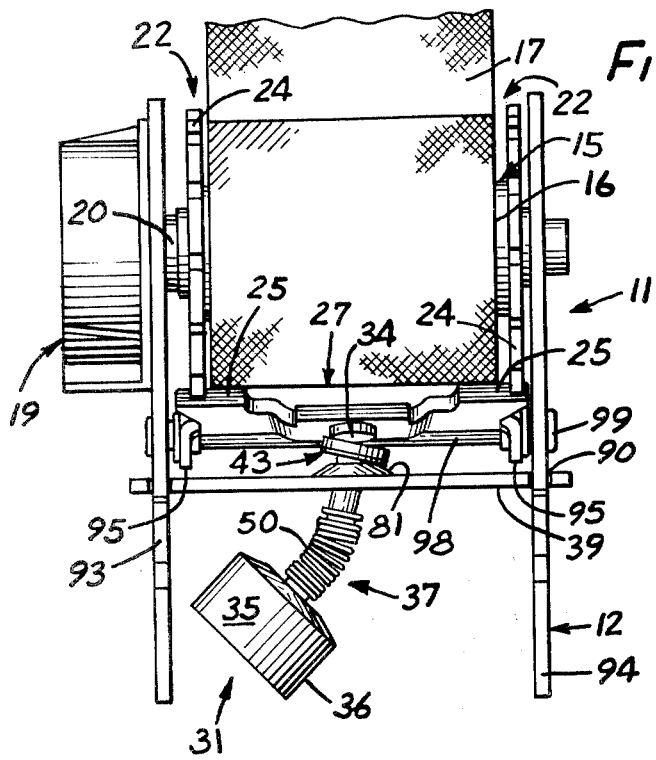
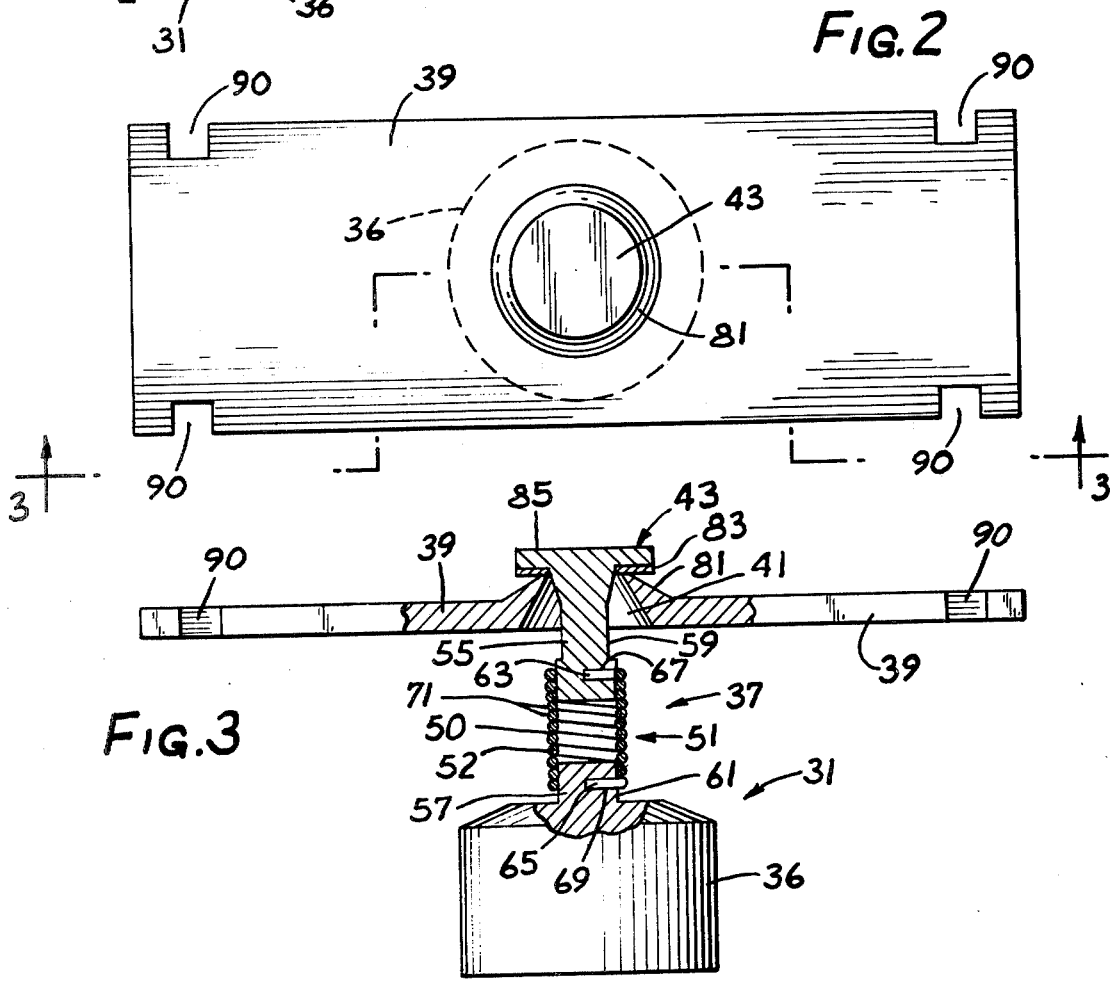

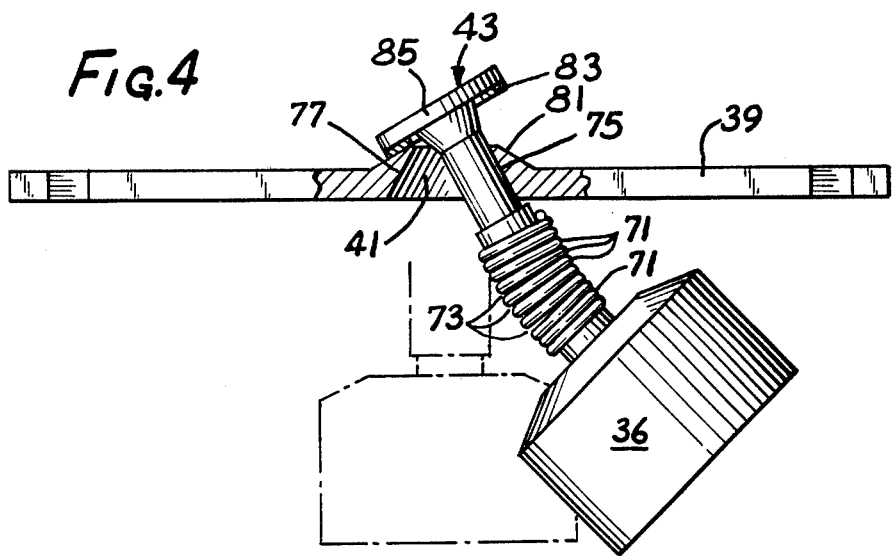
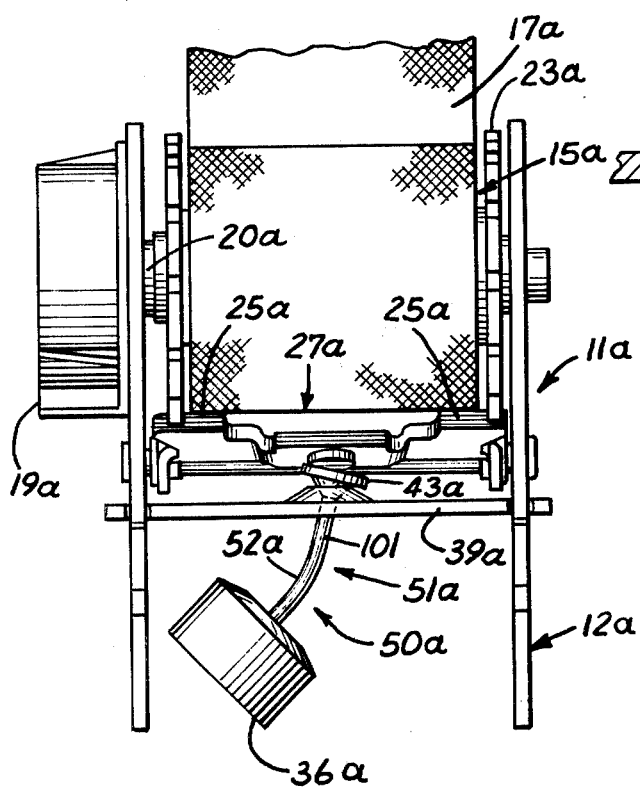
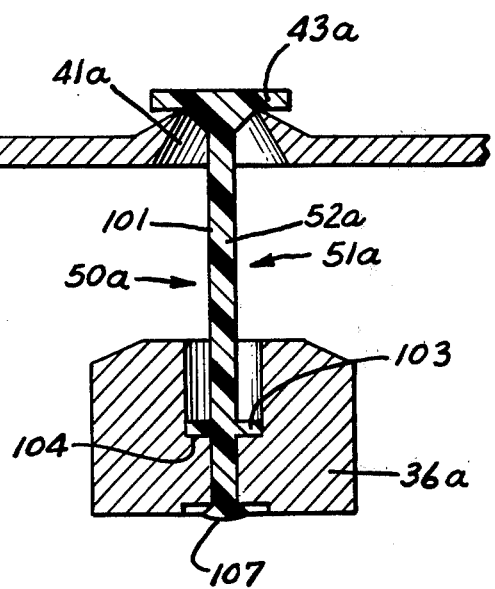

SEAT BELT RETRACTOR

This invention relates to a locking retractor for safety belts and more particularly to an inertia weight operated locking retractor responsive to acceleration forces applied to the retractor.

More specifically, the present invention is directed to the so-called vehicle sensitive retractors having a support or frame affixed to the vehicle so that the retractor receives the same acceleration forces as the vehicle. Typically, an inertia weight in the form of a pendulum mounted weight or in the form of a rolling ball moves relative to the retractor frame in response to acceleration forces and actuates a pawl means for blocking engagement with a toothed ratchet carried on the rotatable belt reel. Usually, a pair of ratchets are affixed to opposite ends of the rotatable reel and the pawl means includes a pair of tooth pawls which are pivotally mounted for pivoting from a release position spaced from the ratchet teeth to a blocking position in which noses on the pawls move inwardly into a space between outer ends of adjacent ratchet teeth to abut abutment walls on the ratchet teeth. In some instances, the timing is such that the pawl noses strike the outer ends of the ratchet teeth and cause the pawl means and inertia weight to swing in the return direction without the pawl noses moving into blocking engagement with the teeth.

The present invention will be described in connection with a common and commercial vehicle sensitive retractor although the present invention may be employed with other retractor constructions and it is not limited to this described construction. In this retractor, the pawl is positioned adjacent the lower side of the ratchet wheels and has a central portion carrying a button or cam follower on the lower side thereof. This cam follower button rests on a cam or control surface formed on the top surface of a pendulum arm having an inertia weight attached to its lower end. A pendulum support member extends laterally between the frame or support members for the reel and has an aperture through which the pendulum arm extends with the enlarged cam control portion disposed on the upper side of the support. In response to abrupt horizontal vehicle acceleration or deceleration, the inertia weight moves relative to the retractor frame swinging the pendulum arm with the cam control portion camming the cam follower upwardly causing the pawl means to pivot about its axis to move the pawl noses toward the blocking position. If the pawl noses should abut the outer ends of the ratchet teeth rather than slipping therebetween, the cam follower pushes against the cam control portion on the pendulum arm to urge the return of the pendulum arm with the result that the ratchet teeth rotate forwardly to expose the space between adjacent teeth but the pawl noses already will have moved away and hence a delay in blocking action will occur.

The present invention has resulted in a commercially acceptable retractor which must meet the many requirements for operation in different planes and in different orientations and undergo various tests. Also, from a commercial standpoint, the retractor must be produced competitively from a cost standpoint with those retractors now in use. While it has been suggested to employ mechanisms in webbing sensitive retractors to lock the retractor should the pawl noses abut the tops of the teeth, the webbing sensitive retractors at this time have not been introduced as widely as the vehicle sensitive retractors. Thus, there is a need to provide an improved vehicle sensitive retractor.

Accordingly, a general object of the invention is to provide a new and improved vehicle sensitive locking retractor.

Another object of the invention is to provide a vehicle sensitive retractor with a potential energy storing device allowing the pendulum weight to be displaced in the pawl actuating direction during the time that the pawl noses are abutting the ratchet teeth.

Other objects and advantages of the invention will become apparent from the following detailed description taken in connection with the accompanying drawings in which:

FIG. 1 is a front elevational view of a retractor embodying the novel features of the invention;

FIG. 1A is a view partially in section illustrating a pawl in blocking engagement with a ratchet wheel on the retractor shown in FIG. 1;

FIG. 2 is an enlarged view of a pendulum support bracket for use in the retractor of FIG. 1;

FIG. 3 is a sectional view taken substantially along the line 3—3 of FIG. 2;

FIG. 4 is an enlarged view showing the swing arm being deflected by the weight when the pawl noses abut the tops of the teeth of the ratchet wheels;

FIG. 5 is a front elevational view of a retractor constructed in accordance with another embodiment of the invention; and FIG. 6 is an enlarged view showing an interconnection of the spring arm and the inertia weight.

As shown in the drawings for purposes of illustration, the invention is embodied in a seat belt retractor 11 having a support or frame 12 in which is rotatably mounted a reel means 15 which includes a reel 16 on which is wound a seat belt 17. The seat belt 17 is wound on the reel under the urging of a biasing means 19 in the form of a spring connected to a reel shaft 20 to thereby turn the reel 16 to retract an extended portion of the seat belt extending outwardly from the reel. Secured to the reel 16 is a tooth ratchet means 22 in the form of at least one ratchet wheel 24 having at least one ratchet tooth 23 for blocking or locking engagement with an end or nose 25 on a pawl means 27. The pawl means is pivotally mounted in the frame 12 for swinging its pawl noses 25 from a release position spaced from a pair of ratchet wheels 24 to an operative position in which the noses 25 on the pawls are in blocking engagement with the teeth 23 on the ratchet wheels 24. An inertia weight actuating means 31 is provided for actuating the pawl means at the time of sudden vehicle acceleration or deceleration.

Various cumbersome mechanisms have been proposed in the past to assist a pawl nose in its entry into the space between ratchet teeth in the event the pawl nose first abuts a ratchet tooth tip, but none of these mechanisms have met with any long term significant acceptance by the automobile industries. The preferred actuating means 31 for the pawls 26 includes an inertia member 36 preferably in the form of a pendulum weight 36 carried on one end of an actuating or pendulum arm 37 which is pivotally supported by a cross or hanger plate 39. The actuating means further comprises a cam or control portion 43 on the top of the pendulum arm 37 for actuating a button or cam follower 34 secured to a central plate of the pawl means.

In accordance with the present invention, the inertia member 31 may continue to move in the pawl actuating direction if the pawl noses 25 strike outer ends 33 of the ratchet teeth 23 and to store potential energy to urge the pawl means into blocking engagement with abutment walls 35 on the ratchet teeth 23 as the reel rotates further to bring the space between teeth into alignment with the pawl noses. Preferably, this is achieved by having the inertia member 35 act through a flexible member 50 which is flexed by the inertia member if the pawl noses 25 hit the tops 33 of the teeth 23. The preferred flexible member is in the form of a pendulum arm 51 or 51a having spring arm or section 52 or 52a carrying the inertia weight 36 at its lower end, the spring arm flexing to allow the weight to continue to travel in the pawl actuating direction with the control button 43 remaining in position to urge the pawl means to pivot the pawl noses 25 into the spaces between adjacent ratchet teeth as the reel turns the outer ends of the teeth forwardly from the pawl noses. As the spring section stretches along one side, as best seen in FIGS. 1 and 4, additional time is being provided to allow the reel to turn the outer ends 33 of the ratchet teeth from abutment with the pawl noses 25 for snapping into the space between the teeth and then to engage the abutment walls 35.

In the embodiment of the invention shown in FIGS. 1–6, the pendulum arm 51 is formed with multiple sections with the spring section 52 being formed as a central section between an upper section 55, which carries the cam control portion 43, and a lower section 57 which is integral with the pendulum weight 36. To achieve a low-cost interconnection of the spring section 52 to the upper section 55 and to the lower section 57, the spring is preferably formed to encircle and grip the outer cylindrical surfaces 59 and 61 on these respective sections and the opposite ends of the spring are inturned ends 63 and 65, respectively, projected into a tight fit within radially extending bores 67 and 69 formed in the respective sections. Manifestly, other manners of connecting the spring to the actuating control portion 43 and/or the inertia weight 36 may be used and fall within the purview of the present invention.

The preferred spring section 52, shown in FIGS. 1–6, comprises the coiled spring having each of its coils 71 abutted and having a predetermined stiffness and flexibility. Herein, the abutted spring coils 71 remain in contact with each other and act as an inflexible or stiff rod when the acceleration impulses are small and when the pawl noses 25 enter between the teeth. However, when the acceleration impulses are large and should the pawl noses abut the ratchet teeth ends 33, the coils may separate at spaces 73 therebetween, as shown in FIG. 4. Stated differently, when the control portion 43 has been stopped or limited in its movement and the inertial force being imparted by the inertia weight 36 to the spring is strong enough to continue movement of the inertia weight in an actuating direction, the coil spring deflects with coils separating along one side of the spring. The actuating direction of the inertia weight may be either a fore or aft direction or a sideways direction or a combination of these directions depending upon the direction of the acceleration impulse being imparted to the vehicle and to the retractor frame.

The cam control portion 43 tilts from a general horizontal position, as shown in FIG. 3, until it is stopped either by movement to the position shown in FIG. 4 in which a wall 75 on the upper section abuts an integral frusto-conical wall 77 of the support plate or until the pawl noses abut outer ends 33 of the teeth and the cam button 34 on the pawl arrests it. It is at this arrest of the pawl noses by the ratchet teeth ends that the inertia weight is able to continue swinging in its pawl actuating direction to separate the coils along one side of the coil spring and during this separation allowing continued displacement of the inertia weight 36 for a period of time while still applying a force to the control portion 43 to urge the pawl noses into blocking engagement with the ratchet teeth. The latter are configured to capture the pawl noses and to hold the pawl in blocking engagement with the ratchet means so long as a continuous belt tension force is exerted to try to unwind the belt further. Also, the ratchet teeth shown herein have broad, inwardly curved surfaces 78 which facilitate the sliding of the pawl noses therealong toward the space afforded at the abutment wall 35. It is only a rare occurrence of abutment of pawl noses with the outer tips of the edges 33 of the ratchet teeth that prevents the pawl noses from sliding repeatedly into engagement with the abutment walls 35 of the ratchet teeth.

The preferred coil spring is self-centering with the coils 71 defining a cylinder having a center line which extends through the center of gravity of the inertia weight 36. The self-centering action results in the centering of the control portion 43 on the top of a frusto-conical surface 81 integrally formed to project upwardly from the support plate 39, as illustrated in FIG. 3. To facilitate the pivoting action of the control portion 43 on the top of the conical surface 81, the under surfaces of the control portion may be coated with a plastic or have a plastic washer 83 for bearing on the top of the frusto-conical surface 81. In the illustrated embodiment of the invention, the control portion 43 is a generally circular button having a flat, planar upper surface 85 although in other instances and in other retractors, control portions are formed with a wedge-shaped button having an upper inclined surface, particularly where the retractor is mounted at an angle and on the roof bar of the vehicle.

The displacement of the control button 43 is limited to a relatively small angular movement, as can be seen by contrasting FIGS. 3 and 4. The retractor weight and arm is an actuating means designed so that an inertia impulse of 0.7 G, or greater, always results in the retractor being locked. The specifications for retractors do not have requirements to lock during low acceleration impulses, however, it is generally designed to avoid locking at less than 0.3 G to prevent overly sensitive systems that would lock during low or moderate vehicle braking conditions.

The supporting plate 39 herein is generally a flat planar plate with the frusto-conical surface 81 being formed therein by a stamping operation. Notches 90 are formed at opposite ends of the supporting plate and are received within openings in the upstanding frame side walls 93 and 94 in the retractor frame and are suitably attached thereto as by staking.

In this embodiment of the invention, the pawl means comprises a one-piece pawl which is formed with a pair of downturned end flanges 95 integral with a central plate portion 97. The downturned flanges 95 are apertured and receive a pivot pin 98 which is inserted into apertures in the retractor side walls and which has an enlarged preformed end 99 at one end and the other end staked and enlarged to mount the pivot pin to span supporting retractor side walls 93 and 94. In this manner, the pawl means is mounted to retract about the axis of the pivot pin 98.

In accordance with the present invention, the flexible member 50 may be in the form of a one-piece pendulum arm 51a which acts as a spring 52a and bends to store potential energy to urge the pawl means into blocking engagement with the abutment walls if the pawl noses first strike the outer ends 33a of the ratchet teeth 23a. The same reference characters with a suffix "a" added are used to describe elements identical or substantially identical to those above described and hence these elements will not be described in detail hereinafter in connection with the FIGS. 5 and 6 embodiment of the invention. The illustrated flexible member 50a is in the form of a rod 101 of plastic which is integral with the cam or control portion 43a. In assembling, the rod 101 is inserted through the aperture 41a in the support plate 39a and is projected in a central bore along the vertical axis of the inertia weight to bring a collar 103 on the rod into engagement with an annular shoulder 104 in the weight with the lower end of the rod projecting outwardly of the bottom wall 105 of the inertia weight. The lower end 107 of the rod 101 is then staked and enlarged as by an application of heat and pressure to secure the weight 36a to the rod with the weight being captured against sliding on the rod between the collar and the staked end. The use of a one piece pendulum arm of plastic eliminates the need for the plastic washer 83 (shown in FIG. 4) or other such noise reducing expedients and results in a lower cost assembly.

By way of illustration only and not by way of limitation, the illustrated rod 101 is about 25.4 mm in length and about 0.241 mm in diameter and supports a weight of about 49 grams. The stiffness of the rod 101 is preferably such that under small acceleration or deceleration pulses of 0.3 G or less, it does not bend appreciably as would cause the pawls to lock with the ratchet teeth such as when the automobile is tilted at an angle of 17°, but for forces of 0.7 G or greater the weight 36a will bend the rod 101 sufficiently to provide the weight overtravel and the additional time for the pawl noses to move into engagement with the abutment walls of the ratchet teeth. Likewise, when the retractor shown in FIG. 1 is tilted at 17° the coiled spring likewise does not bend to a degree that would actuate the pawl mechanism. The flexibility or stiffness of the spring member may be varied to meet the design requirements of the various users. Other shapes and sizes and materials may be used for the spring member 50a and still fall within the purview of this invention.

From the foregoing, it will be seen that the present invention provides increased response time for the pawl actuating means to be effective should the pawl tips abut the outer ends of the ratchet teeth. The deflection of the weight carrying spring arm allows the inertia member to overtravel in its pawl actuating direction for the fraction of a second needed for the reel to turn the tips of ratchet tip from the pawl noses allowing the latter to move into blocking engagement with the abutment walls of the ratchet teeth and block belt extension as at the time of an accident. The overtravel of the inertia weight may be achieved by the use of an inexpensive spring arm for the weight in place of the conventional stiff pendulum arm of conventional retractors.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A seat belt retractor for vehicles comprising a support, a reel having a safety belt thereon mounted for rotating on said support in a first direction to wind the belt on the reel and for turning in the opposite direction with unwinding of the belt from the reel, means biasing said reel to rotate in a direction to wind said belt thereon, a ratchet means connected to said reel to rotate therewith and having a plurality of teeth thereon, said teeth having an inner abutment wall and an outer tooth end, a pawl means having a nose for engagement with said teeth on said ratchet means and movable from an inoperative position spaced from said ratchet means to a blocking position to engage an abutment wall on a ratchet tooth and to block the rotation of said reel and to block unwinding of the belt from said reel, an actuating means having an inertia weight for actuating said pawl means toward said blocking position, said actuating means including a one-piece plastic shaft having a lower end connected to said weight and having an integral plastic upper end constituting an enlarged control cam member to pivot said pawl means, an apertured plate on said support having an aperture through which extends said plastic shaft with said integral plastic control cam member on the upper side of said apertured plate and said weight on the lower side of said plate, said inertia weight having a substantially vertically extending bore therethrough, means on said plastic shaft for engaging said inertia weight to prevent the sliding of the inertia weight upwardly along said shaft and means connected to said plastic shaft at the lower side of said weight for preventing said weight from sliding down and from said shaft, said plastic shaft bending when said pawl means hits an outer tooth end and storing potential energy and converting the same to shift said pawl means to said blocking position.

2. A retractor in accordance with claim 1 in which said cam control member is a generally disc-shaped member and in which said apertured plate is formed with an upwardly extending frusto-conical surface having its axis aligned with the axis of said aperture through which said plastic shaft extends, said disc resting on the upper edge of said frusto-conical surface for tilting thereabout.

3. A retractor in accordance with claim 1 in which said plastic shaft is sufficiently rigid to withstand bending moments applied thereto by said inertia weight when the support is tilted at an angle up to 17° from its normal at rest position as would actuate the pawl mechanism.

* * * * *